US005423058A

United States Patent [19]

Cudak et al.

[11] Patent Number: 5,423,058

[45] Date of Patent: Jun. 6, 1995

[54] SIMULCAST TRANSMISSION SYSTEM WITH SELECTIVE CALL TONES

[75] Inventors: Mark C. Cudak, Mount Prospect; Bradley M. Hiben, Glen Ellyn; Robert D. Lo Galbo, Elk Grove Village, all of Ill.

[73] Assignee: Motorola, Inc., Schaumburg, Ill.

[21] Appl. No.: 197,369

[22] Filed: Feb. 17, 1994

Related U.S. Application Data

[63] Continuation of Ser. No. 956,187, Oct. 5, 1992, abandoned.

[51] Int. Cl.$^6$ .............................................. H04B 7/14

[52] U.S. Cl. .................................. 455/51.2; 455/56.1; 455/67.6

[58] Field of Search .................... 455/49.1, 51.1, 51.2, 455/53.1, 54.1, 18, 56.1, 33.4, 57.1, 67.6, 67.1, 33.1; 370/108; 375/107; 379/57, 93; 359/146; 342/386

[56] References Cited

U.S. PATENT DOCUMENTS

| | | | |
|---|---|---|---|
| 4,188,582 | 2/1980 | Cannalte et al. . | |
| 4,363,129 | 12/1982 | Cohn et al. . | |
| 4,696,052 | 9/1987 | Breeden . | |
| 4,850,032 | 7/1989 | Freeburg | 455/51.2 |
| 4,972,410 | 11/1990 | Cohen et al. | 455/51.2 |
| 5,077,759 | 12/1991 | Nakahara | 455/51.1 |
| 5,117,424 | 5/1992 | Cohen et al. | 455/51.1 |
| 5,127,101 | 6/1992 | Rose, Jr. | 455/51.1 |
| 5,172,396 | 12/1992 | Rose, Jr. et al. | 455/51.2 |

FOREIGN PATENT DOCUMENTS

| | | | |
|---|---|---|---|
| 0082028 | 4/1988 | Japan | 455/51.1 |
| 0026135 | 1/1990 | Japan | 455/51.2 |
| 0096132 | 4/1991 | Japan | 455/51.1 |

*Primary Examiner*—Reinhard J. Eisenzopf
*Assistant Examiner*—Nguyen Vo
*Attorney, Agent, or Firm*—M. Mansour Ghomeshi

[57] ABSTRACT

A simulcast radio transmission system (250) transmits message signals (318) including selective call tones, originating from a message source (202), to a geographical area (115). The simulcast system includes a controller (204) coupled between the message source (202) and a plurality of remote transmitter sites (208, 210) for exchanging message signals (318) including selective call tones therebetween. Connecting the controller (204) to the plurality of transmitter sites (208, 210) are a plurality of interconnect links (224, 226), each having bounded propagation time delay characteristics. The simulcast system (250) employs phase numbers associated with the starting phase of the selective call tones to allow accurate reconstruction of the selective call tones. The controller (204) then combines (508) the message signals (318) with the launch time and the phase number to establish a message bundle and sends the message bundle to at least one of the plurality of transmitters (208, 210), via at least one of the plurality of interconnect links (224, 226).

14 Claims, 5 Drawing Sheets

SIMULCAST TRANSMISSION SYSTEM WITH SELECTIVE CALL TONES

This is a continuation of application Ser. No. 07/956,187, filed on Oct. 5, 1992, and now abandoned.

TECHNICAL FIELD

This invention relates generally to simulcast radio transmission systems, and particularly to such systems having to launch message signals including selective message signals at a predetermined time.

BACKGROUND OF THE INVENTION

The use of simulcast transmission to increase the effective coverage area of land-mobile radio systems is well known in the art. In simulcast transmission, two or more transmitters, broadcasting identical information simultaneously on the same frequency, are located such that contiguous coverage is available over a larger area than can be covered by the transmitters acting alone. Simulcast transmission systems require that the base band signals be transmitted at a precisely controlled time. If the signal is transmitted by the various transmitters at the wrong time, distortion occurs in the area where signals from both transmitters are received with similar signal strengths. This distortion effect is present when the various signals arrive at the receiving end with even slight phase, or timing, differences with respect to each other.

FIG. 1 shows a simplified graphical representation of a typical simulcast radio transmission system 100. The system comprises two base stations, or remote site transmitters 101, 103. Remote site transmitter 101 has an accompanying coverage area 111, within which subscriber units 105, 107 are able to receive transmitted messages via transmissions 119, and 117, respectively. Similarly, remote transmitter site 103 has an accompanying coverage area 113, within which subscriber units 107, 109 are able to receive transmitted messages via transmissions 118, and 121, respectively. Note that coverage areas 111 and 113 have, by design, an overlapping coverage area 115, within which a subscriber unit 107 receives transmissions from both transmitters. It is this overlapping coverage area 115 that incorporates simulcast technology in order to enhance the respective coverage areas of the transmitter sites involved. Accordingly, these transmissions 117, 118 are perceived by subscriber unit 107 as a single signal.

FIG. 2 shows a simplified block diagram of a typical simulcast radio transmission system 200. A typical transmission sequence begins when a message source 202 (e.g., console, radio, key management center (KMC), etc.) sends a message signal to be transmitted to one or more coverage areas. Upon receipt of the message signal, the controller 204 distributes the message signal to one or more remote site transmitters (e.g. 208, 210). This distribution is typically done through an expensive microwave distribution system 206 which comprises, for example, interconnect links 214, 216. When the message signal has been received at the remote site transmitter, for example transmitter 208, the message is transmitted to an awaiting mobile subscriber unit within the coverage area for that site.

Because of the critical timing requirements of simulcast transmission, the interconnect links must be precisely calibrated, or netted, using a variable delay within the receiving modem at each remote site transmitter. Such calibration maintenance is required to insure that the total propagation delays are identical across all interconnect links. Microwave distribution is used because other methods, such as telephone lines, do not maintain constant propagation delays over time, thus demanding more frequent maintenance cycles. Additionally, custom-built modems are required in order to maintain the required frequency response tracking and provide needed features. These are very costly when compared with off-the-shelf modems that are readily available. Furthermore, the system must be re-netted occasionally, which is usually performed from a central site at which signals from the transmitter site can be received and the signal delay measured. Test signals and expensive measurement equipment are used to determine signal delays for each site, while a data network is used to adjust these measured delays. Simpler, less expensive calibration systems do exist, but these do not generally perform well on systems using high speed data rates, such as those in a typical simulcast environment operating at or beyond 9600 bits/-second.

Recent simulcast systems utilize highly accurate time sources, such as those available using Global Positioning System timing receivers, to synchronize the transmission time at the various simulcast transmitter sites. These systems synchronize digital signals and voice band signals that have been distributed to the transmitter sites through digital networks by appending "Launch Time" information to the signal to tell the transmitter the time at which to transmit the signal. In systems, selective call tones are generated and added by the transmitter since low frequency tones typically will not pass through a voice band network. Selective call tones, such as private line (PL) codes, are used in communication systems for unit identification purposes. If used, these tones are continuously transmitted, along with other information, and provide for a receiver to receive the information upon detecting a desired tone. These tones are highly phase sensitive and must be transmitted with the same phase from the remote site transmitters in order to prevent falsing at the receiving units. A problem arises in how to control the phase of the selective call tone especially when interruptions of the distribution network can occur and are required to have minimum impact. In the current state of the art, an interruption in information transfer to one of the plurality of simulcast transmitters leads to that transmitter's selective call tone being permanently out of phase with the selective call tone of the other transmitters.

Accordingly, there exists a need for a simulcast radio communication system which is capable of meeting the critical timing and phase requirements of simulcast transmission.

SUMMARY OF THE INVENTION

The present invention encompasses a simulcast radio transmission system for transmitting message signals, including selective call tones, originating from a message source, to a geographical area. The simulcast system includes a central controller coupled between the message source and a plurality of remote site transmitters for exchanging message signals therebetween. Connecting the controller to the plurality of transmitter sites are a plurality of interconnect links, each of which have bounded propagation time delay characteristics. The simulcast system employs a precision reference timing signal for calculating a launch time, which calculation also rises a predetermined propagation time delay for determining the launch time. The controller then combines the message signals with the launch time and a selective call tone phase number to establish a message bundle and sends the message bundle to at least one of the plurality of transmitters, via at least one of the plurality of interconnect links.

DETAILED DESCRIPTION OF A PREFERRED EMBODIMENT

Figure 1:
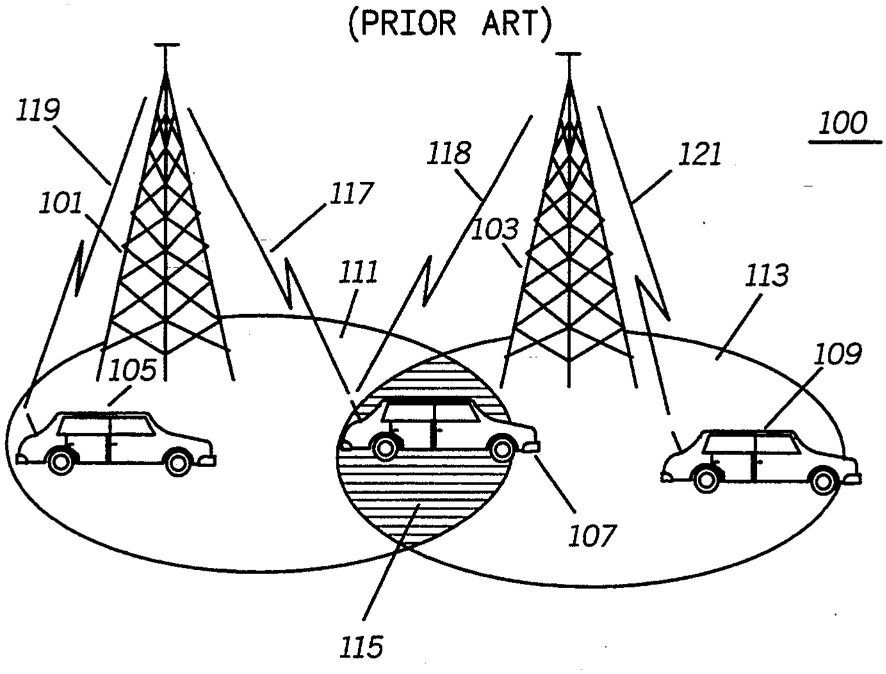
FIG. 1 (PRIOR ART)
FIG. 1 is a graphical representation of a partial simulcast radio transmission system, known in the art, which shows the respective coverage areas for two remote site transmitters.
Figure 2:
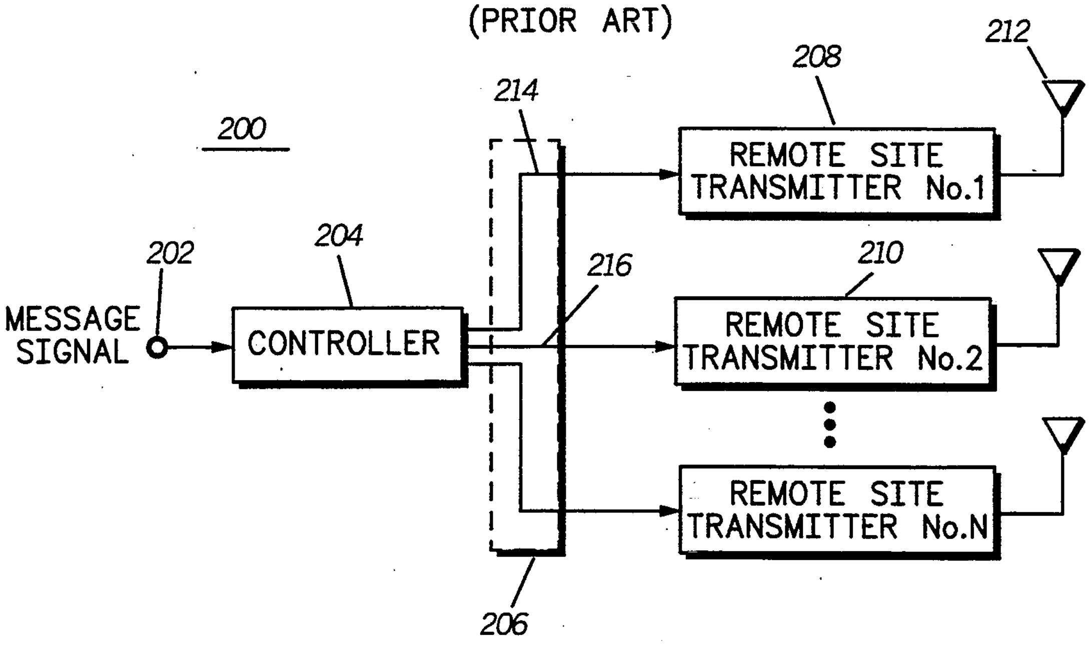
FIG. 2 (PRIOR ART)
FIG. 2 is a simplified block diagram of a typical simulcast radio transmission system which is known in the art.
Figure 3:
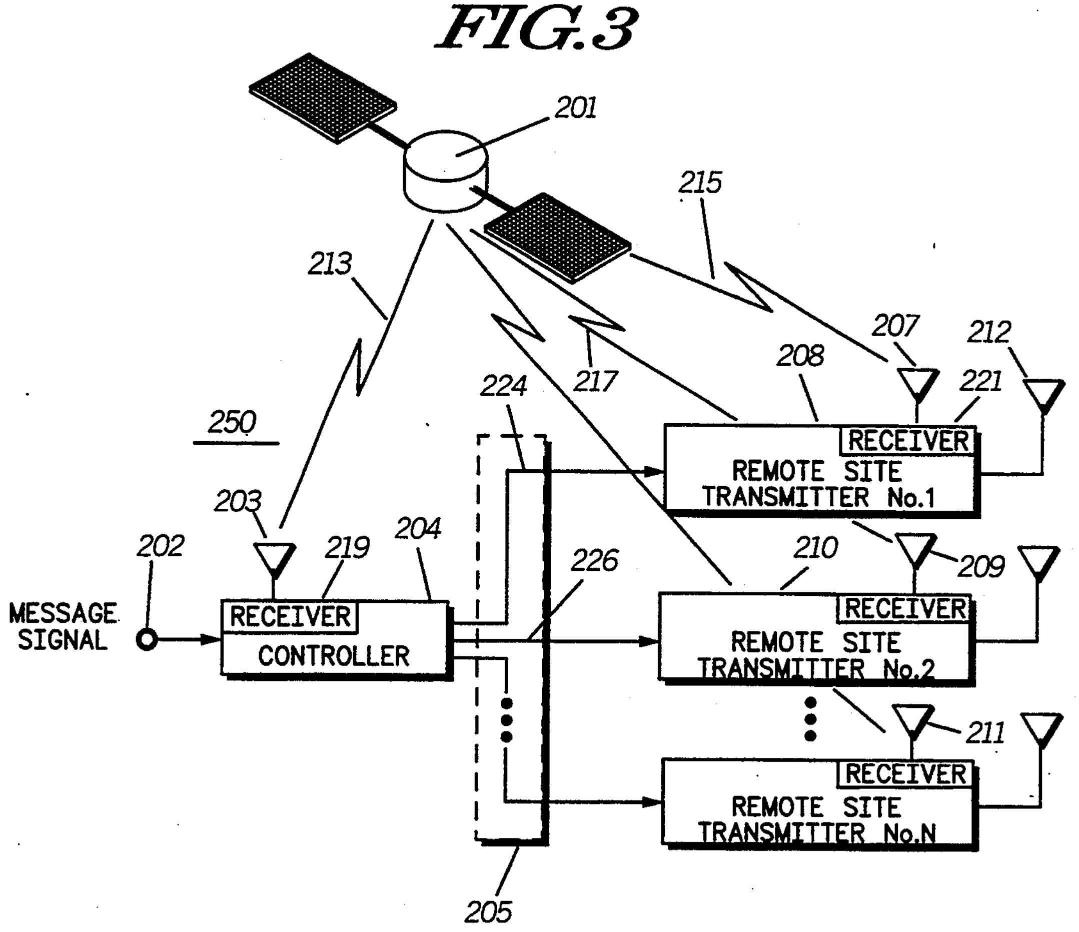
FIG. 3 is a simplified block diagram of a simulcast radio transmission system which employs a GPS timing reference signal scheme, in accordance with the present invention.

FIG. 3 shows a simplified block diagram of a simulcast radio transmission system 250, in accordance with the present invention. Message source 202 sends a message signal to controller 204. Upon receipt, controller 204 converts, if necessary, the received message signal, which may be in either analog or digital form, into digital form before passing it to the respective transmitters, for example transmitters 208, 210. Additionally, the present invention employs precision receivers 219, 221 in order to establish the critical timing features of the simulcast radio transmission system. In the preferred embodiment of the present invention, an earth-orbiting vessel 201 is used to transmit a precision timing signal to each of the respective antennas 203, 207, 209, 211 within the system. These antenna/receiver combinations, for example antenna 203 in combination with receiver 219, are used to establish an exact, or absolute, time reference for the controller and remote site transmitters within the simulcast system. At the sending end, controller 204 calculates a "launch" time (i.e., a predetermined, exact, future time at which the buffered message data is to be sent to the transmitting end of the remote site transmitter). In the preferred embodiment of the present invention, this launch time is based on the precision timing reference signal and a predetermined propagation delay, generally slightly more than the expected maximum delay for the interconnect links in the distribution system 205. In addition to the launch time, a phase number corresponding to the phase angle of the selective call tone is computed. The selective call tone phase angle number corresponds to the phase of the tone required at the launch time given. The launch time and phase number are then combined with the digital representation of the original message signal to form a message bundle, and sent, for example via interconnect links 224, 226, to one or more of the remote site transmitters 208, 210 within the simulcast radio transmission system.

In order to calculate the launch time and the phase number, two constants and two variables must be tracked by the system. The constants are the data frame period, $F_p$, and the tone frequency, $T_f$, while the variables are the initial launch time, $T_{initial}$, and the frame number relative the first launch frame, $F_n$. The late entry launch time, $T_{late\text{-}entry}$, is calculated as $$T_{late\text{-}entry}=[(F_p*F_n)+T_{initial}] \text{ Modulo } T_{1sec}$$

where $T_{1sec}$ is an integer representing 1 second of launch windows.

The phase of the low frequency tone is tracked by calculating the phase number or phase offset, $PH_{offset}$, introduced after each frame of data. Because of the constraints of fixed point arithmetic, the phase should be tracked as a rational fraction. (Tracking the phase using a 24-bit fixed point fraction can introduce a 1 micro-sec error every 10 minutes for a 200 Hz tone.) In fact, the period of the data frame should be represented in fractional form when computing the phase number. For example, assume the data rate is 9600 bits/sec and the frame length is 1728 bits. The frame period would be represented as $$F_p=1728/9600 \text{ sec}=9/50 \text{ sec.}$$

Similarly if the low frequency tone is 192.4 Hz, the tone frequency is represented as $$T_f=1924/10 \text{ Hz}=962/5 \text{ Hz.}$$

$PH_{offset}$ is calculated using the fractional form of $T_f$ and $F_p$ by taking the fractional part of the product in reduced form. For example, if the values for $F_p$ and $T_f$ are taken as before, $PH_{offset}$ is calculated by the following formula assuming zero initial phase.

$$PH_{offset} = \text{Fraction}(T_f*F_p) = \text{Fraction}[(9/50)*(962/5)] = \text{Fraction}(34 + 158/250) = 79/125$$

The number discrete phase offsets that the tone can take on is represented in the denominator of $PH_{offset}$. Finally, the late entry phase, $PH_{late\text{-}entry}$, can be calculated by $$PH_{late\text{-}entry}=\text{Fraction } (F_n*PH_{offset})$$

The use of rational fractions allow this system for low frequency tone late entry to be absolutely accurate even if the simulcast call last several hours.

The message bundle contains only a small part of the complete communication message and several message bundles are sent to convey a complete communication message. Each communication bundle has a unique time stamp corresponding to when the transmitter should transmit the information in the bundle and a selective call tone phase number corresponding to the phase that the selective call tone should be at the corresponding launch time. The launch time and selective call tone phase number are included with every message bundle so that a transmitter will be able to resynchronize after a temporary interruption of the communication link between the central site and the transmitter. Similarly, antenna 207, in combination with receiver 221, receives a timing reference signal which is then used by the remote site transmitter 208 as an exact, or absolute, timing reference. Upon receipt of the message bundle, transmitter 208, for example, strips off the launch time and selective call tone phase number and reconstructs the original message signal using the digital representation which is sent in the message bundle. The selective call tone phase number is used to generate a tone whose phase will be the phase given by the phase number at the launch time. This tone is summed in with the original message and placed into the transmit buffer. A comparison is then made between the current absolute time provided by the timing reference signal receiver 221 and the launch time received from the controller. When these respective times are identical, antenna 212 then transmits the reconstructed message signal to the coverage area for that transmitter, thus ensuring substantially identical transmission times among all the active remote sites. The timing signals received from the GPS are typically phase-synchronized to within 100 nanoseconds. However, the phase difference between the resident phase-locked-loops (PLLs) at the various remote sites may add up to 325 nanoseconds, resulting in a worst-case timing difference of approximately 425 nanoseconds.

In the preferred embodiment of the present invention, a highly accurate and precise timing source is used, such as that found in a global positioning system (GPS). Since this absolute time reference is independently sent to both the sending (controller 204) and receiving (remote site transmitters 208, 210) ends, the interconnect links 224, 226 which make up distribution system 205, may include inexpensive, time-variant medium, for example public switched telephone network (PSTN) lines. Also, inexpensive, off-the-shelf modems may be used for establishing sending and receiving end protocols. In addition to saving hardware costs, use of such a distribution system 205 provides a system which does not require the costly maintenance of a typical microwave distribution system.

Figure 4:
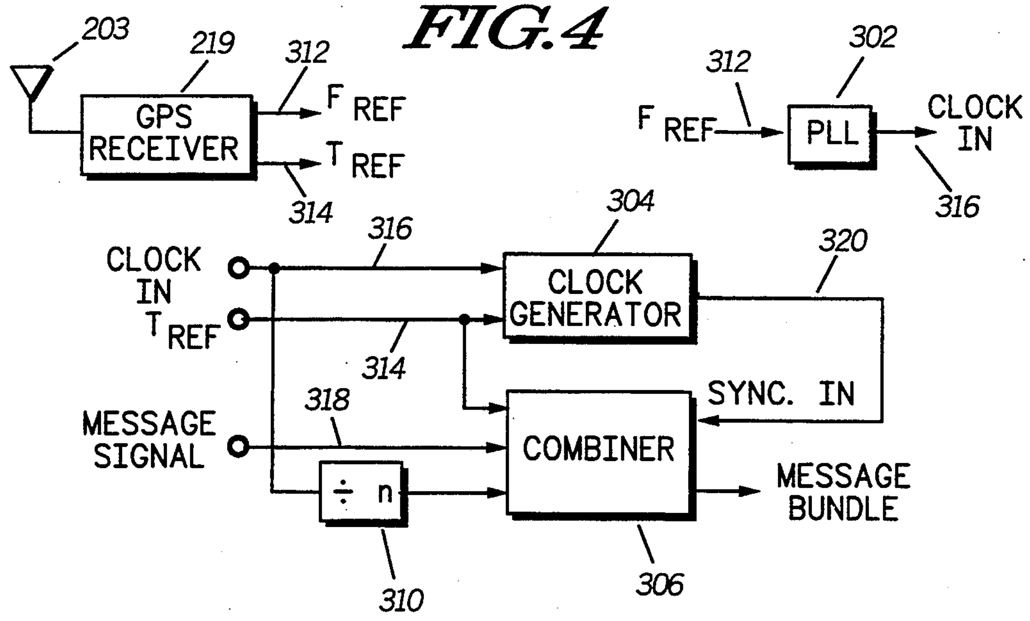
FIG. 4 is a simplified block diagram of the hardware components which make up a simulcast radio transmission system controller, in accordance with the present invention.

FIG. 4 shows a simplified block diagram of the internal components of a controller 204. The GPS antenna 203 is used to receive precision timing reference signals from an earth-orbiting vessel 201. Frequency reference signal 312 ($F_{ref}$) and timing reference signal 314 ($T_{ref}$) are then generated by the GPS timing receiver 219. The $F_{ref}$ signal is then used as an input to a typical PLL circuit 302 in order to generate a clock input signal 316, which is then used as a timing input to clock generator 304. Clock generator 304 uses the clock input signal 316 and the $T_{ref}$ signal 314 to update the internal absolute time clock, which serves to synchronize the clocks within the various remote sites, generally to within 425 nanoseconds. Furthermore, clock generator 304 sends a master synchronization input signal 320 to the combiner 306 which is used, along with $T_{ref}$ signal 314, to produce a time stamp to be combined with the message signal 318. Also, clock input 316 is used as an input to a divide-by-n circuit 310 which then establishes the data rate at which the message bundle is transferred onto the distribution system 205. In the preferred embodiment of the present invention, the frequency of the clock input signal 316 is 3.072 MHz which, by using a divide-by-320 circuit, provides a 9.6 kHz data rate on the distribution system 205. Of course, any combination of frequencies and circuitry may be used to produce the desired results for a given distribution system. Furthermore, this data rate clocking scheme may be provided by the distribution system itself.

Figure 5:
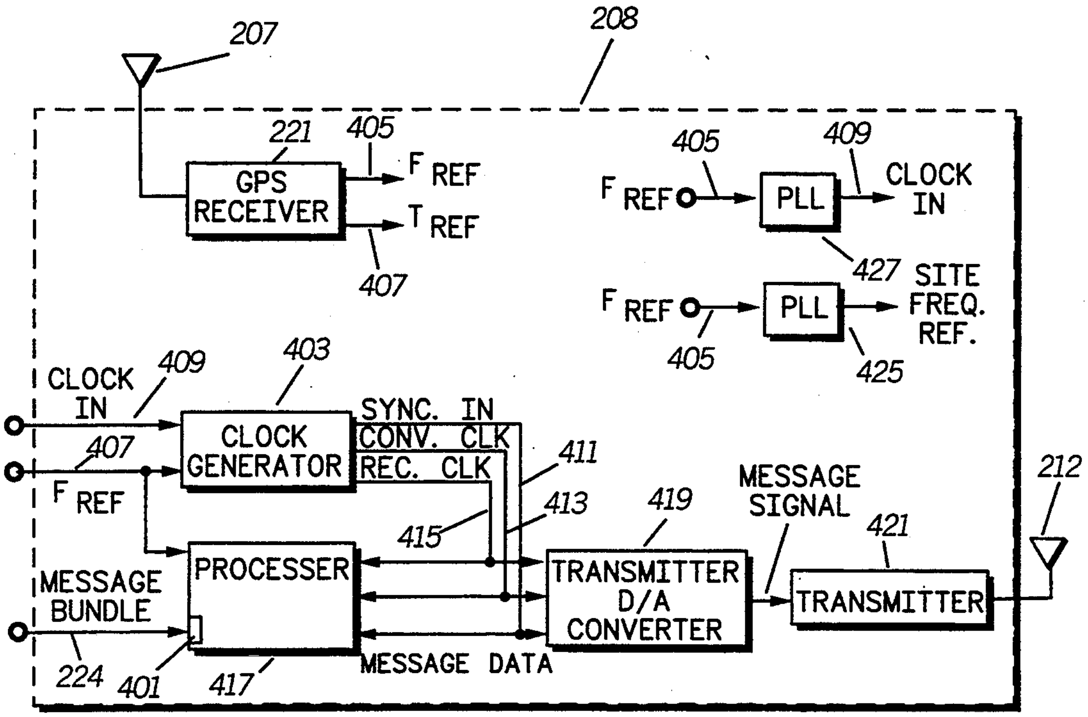
FIG. 5 is a simplified block diagram of the hardware components which make up a simulcast radio transmission system remote site transmitter, in accordance with the present invention.

FIG. 5 details one hardware implementation of a remote site transmitter 208, in accordance with the present invention. Similarly to the controller embodiment, the GPS receiver 221, upon receipt of the GPS precision timing reference signal, generates the frequency reference signal 405, and the timing reference signal 407. The frequency reference signal 405 is used, in combination with a typical PLL circuit 425, to generate the site frequency reference for the transmitter 208, which may, as in the preferred embodiment, operate at 14.4 MHz. As in the controller, the frequency reference signal 405 is also used, in combination with a PLL circuit 427, to produce a clock input signal 409 for the clock generator 403. Such a clock generator produces a master synchronization input 411, a convert clock input signal 413, and a receive data clock signal 415 which, in the preferred embodiment, are used to provide synchronizing and clock data to the signal processing hardware; processor 417 and D/A converter 419 (e.g., Motorola codec Model No. MC145402).

Upon arrival of the message bundle at the remote site transmitter 208, processor 417 separates the message bundle into its sub-components; digital message data representing the message signal, launch time data, and the selective call tone phase number. Note that the message bundle may also include additional information, such as control data, diagnostic data, etc. The selective call tone of the proper phase is generated using the information provided by the selective call tone phase number and the tone is summed with the message signal. The message signal plus selective call tone is then placed into a data buffer 401, which may be a first-in-first-out (FIFO) buffer. The message signal plus selective call tone is held in this data buffer until the current time of day, provided by manipulation of the timing reference signal 407, matches exactly with the launch time provided in the message bundle. When this condition exists, the message data is passed to the D/A converter 419 to reconstruct the original message signal. The reconstructed message signal is then sent, via transmitter 421, out to the coverage area defined by the location of that remote site transmitter.

Figure 7:
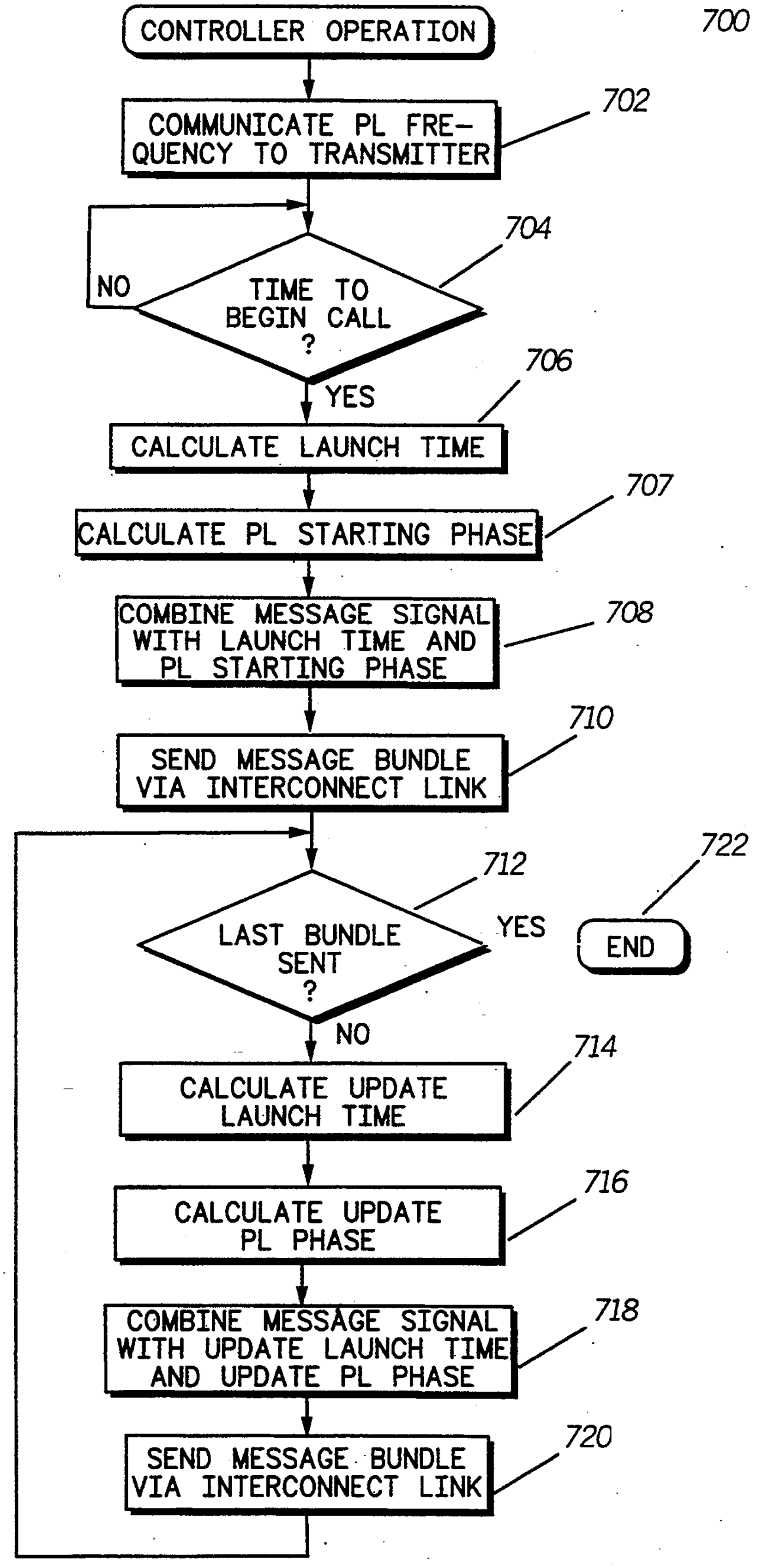
FIG. 7 is a flow diagram detailing the operation of the simulcast radio transmission controller shown in FIG. 3, in accordance with the present invention.

FIG. 7 shows a flow diagram 700 outlining the operation of the controller 204. The sequence begins with communicating selective call or private line (PL) frequency information 702 to the remote site transmitters 208 and 210. This can be done through signaling between the controller and transmitter or by programming the frequency into the controller and transmitter at the time of manufacture. A condition block 704 follows evaluating whether it is time to begin a call. This can be evaluated by looking for the presence of a message bundle with a communication message to be transmitted. The NO output routes back to the input of block 704. The YES output is followed by calculating the launch time and the starting phase of the selective call tone, blocks 706 and 707. Block 708 combines message signals with launch time and starting phase information to produce a message bundle. The output of block 708 is coupled to block 710 where the message bundle is sent to the transmitter sites 208, 210, . . . via links 224, 226, . . . , respectively.

A condition block 712 determines whether the last message bundle was sent. The YES output indicating successful transmission is coupled to the END block 722. The NO output is coupled to blocks 714 and 716 where the update launch time and update PL starting phase are calculated. The controller then combines the message signal with the launch time and PL starting phase information via block 718 to generate a message bundle to be sent out on the distribution system. The message bundle is then sent, block 720, via at least one interconnect links 224, 226, . . . , to one or more of the remote site transmitters 208, 210, . . . .

Figure 6:
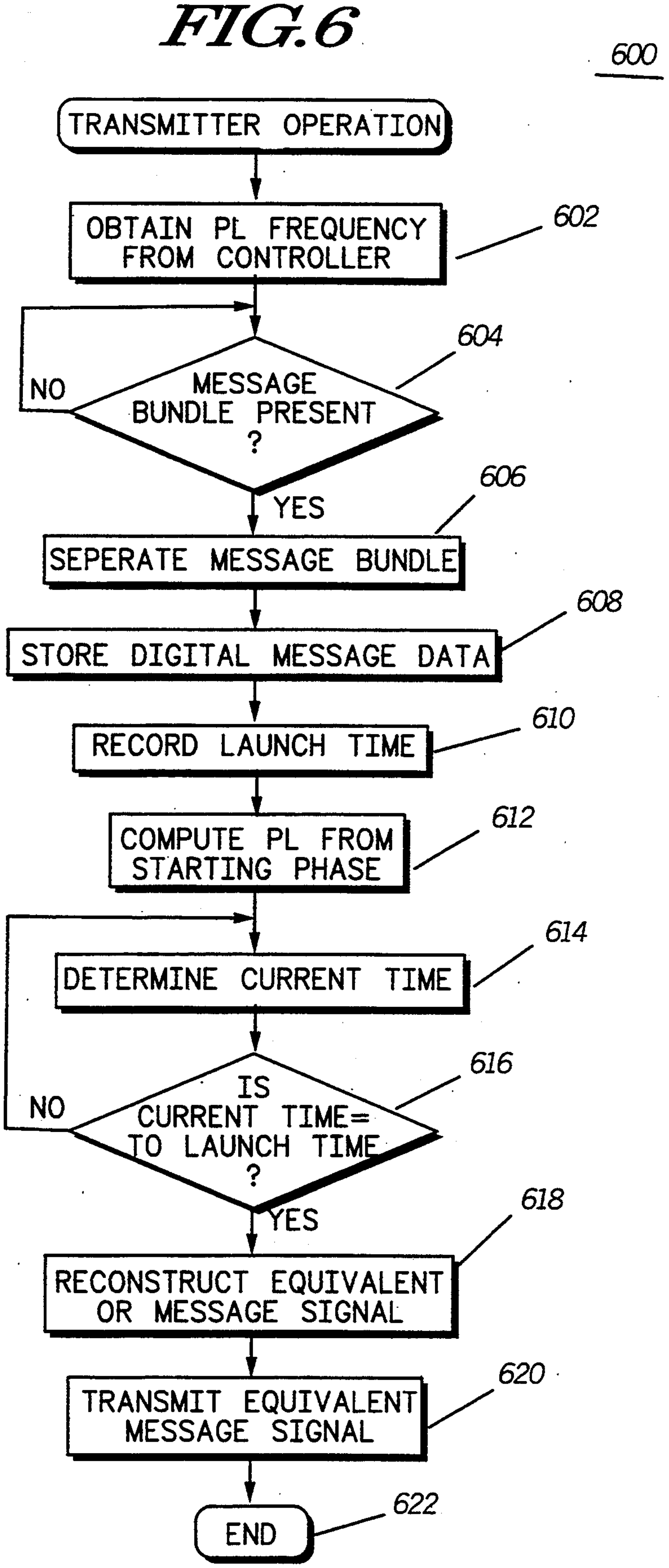
FIG. 6 is a flow diagram detailing the operation of the simulcast radio transmission remote site transmitter shown in FIG. 5, in accordance with the present invention.

The operation of the remote site transmitter is shown in FIG. 6 as flow diagram 600. The transmitter initially obtains PL frequency information from the controller, block 602. Again, this can be done through signaling by sending the PL frequency ($T_f$ is the frequency of the PL tone) as part of the message bundle between the controller and the transmitter or by programming the frequency into the controller and transmitter at the time of manufacture. Following this block a condition block 604 determines if a message bundle is present, indicating a communication message must be transmitted. The NO output is returned to the input of the condition block 604. The YES output is coupled to block 606 where the message bundle is separated. The remote site transmitter separates the message bundle into launch time data, PL starting phase information, and digital message data, and removes all other data which is unnecessary to the simulcast transmission (e.g., diagnostics, control information, etc.). The digital message data is temporarily stored. Using the PL phase number, a tone with the proper phase is generated. This is done by starting an oscillator tuned to have frequency $T_f$ at the phase given by the phase number ($PH_{late\_entry}$), a procedure well know in the art of digital frequency generation. This tone is then summed to the message data to be transmitted. The output of block 612 is coupled to block 614 where the current absolute time is determined using the precision timing reference signal before the routine goes to decision block 616, where it is determined whether or not the current absolute time is the same as the launch time. If not, the remote site transmitter routine returns to the block 614 to get an updated current time, after which it returns to decision block 616. If the absolute time is equivalent to the launch time, YES at the output of the block 616, the message signal is reconstructed via block 618 to an equivalent form using the digital message data. The remote site transmitter then transmits the reconstructed equivalent of the message signal with the phase of the PL signal being exact with the other transmitter sites, before the routine is exited at block 622.

What is claimed is:

1. A simulcast radio transmission system for transmitting message signals, originating from a message source, to a geographical area, the message signals including at least one selective call tone having a starting phase and adapted for identifying the message source the simulcast radio transmission system comprising:

- a controller coupled to the message source and a plurality of remote site transmitters for exchanging message signals therebetween;
- a plurality of interconnect links, coupled between said controller and said plurality of remote site transmitters, having bounded propagation time delay characteristics;
- means for receiving at the controller a precision reference timing signal;
- means for calculating at the controller a launch time based on said precision reference timing signal and a predetermined propagation time delay, wherein the launch time is the time at which the message signals are to be transmitted by at least one of the plurality of remote site transmitters;
- means for calculating at the controller the starting phase of the at least one selective call tone, wherein the starting phase is the phase at which the at least one selective call tone is to be transmitted at launch time, to allow at least one of the plurality of remote site transmitters to substantially determine the phase of the at least one selective call tone which is transmitted at the launch time;
- means, coupled to said controller, for gathering the message signals and combining said gathered message signals with said launch time and information on the starting phase of the at least one selective call tone to establish a message bundle; and
- means for sending said message bundle to said at least one of said plurality of remote site transmitters, via at least one of the plurality of interconnect links.

2. The simulcast radio transmission system of claim 1, wherein said predetermined propagation time delay is substantially equal to a maximum propagation time delay associated with said plurality of interconnect links.

3. The simulcast radio transmission system of claim 1, wherein at least one of the plurality of interconnect links comprises a microwave communication channel.

4. The simulcast radio transmission system of claim 1, wherein at least one of the plurality of interconnect links comprises public switched telephone network (PSTN) lines.

5. The simulcast radio transmission system of claim 1, wherein at least one of the plurality of interconnect links comprises fiber optic communication medium.

6. The simulcast radio transmission system of claim 1, wherein said means for receiving a precision reference timing signal comprises a Global Positioning System (GPS) receiver.

7. A controller for use in a simulcast radio transmission system, said controller is linked to a message source and coupled, via a plurality of interconnect links having bounded propagation time delay characteristics, to a plurality of transmitters for transmitting message signals, along with at least one selective call tone for identifying the message source, to a geographical area, the at least one selective call tone having a frequency and a starting phase and the message signals including information on the frequency and the starting phase of the at least one selective call tone, the controller comprising:

- means for gathering the message signals from the message source;
- means for receiving a precision reference timing signal and information on the starting phase of the at least one selective call tone;
- means for calculating a launch time based, at least in part, on said precision reference timing signal and a predetermined propagation time delay, wherein the launch time is the time at which the message signals are to be transmitted by at least one of the plurality of remote site transmitters;
- means for calculating a phase number which corresponds to the starting phase that the at least one selective call tone, wherein the starting phase is the phase at which the at least one selective call tone is to be transmitted at launch time, is to be at the launch time to allow at least one of the plurality of remote site transmitters to substantially determine the phase of the at least one selective call tone which is transmitted at the launch time;

means for combining said gathered message signals with said launch time and the phase number to establish a message bundle; and means for sending said message bundle to at least one of the plurality of remote site transmitters, via at least one of the plurality of interconnect links.

8. The controller of claim 7, wherein said means for receiving a precision reference timing signal comprises a Global Positioning System (GPS) receiver.

9. The controller of claim 7, wherein said means for combining comprises a digital signal processor.

10. A remote site transmitter for use in a simulcast radio transmission system, said remote site transmitter is coupled to a central controller which receives from a message source a message signal, along with at least one selective call tone for identifying the message source, including selective call tones to be transmitted to a geographical area, the at least one selective call tone having a frequency and a staring phase and the message signals including information on the frequency and the starting phase of the at least one selective call tone, the remote site transmitter receiving from the central controller a message bundle, via an interconnect link, the remote site transmitter comprising:

means for separating the message bundle into digital message data, information on the at least one selective call tone starting phase, and a launch time, wherein the launch time is the time at which the message signals are to be transmitted by at least one of the plurality of remote site transmitters;

means for storing said digital message data;

means for recording said launch time;

means for generating at the least one selective call tone, including the starting phase, wherein the starting phase is the phase at which the at least one selective call tone is to be transmitted at launch time, from the information on the frequency and the starting phase which is transmitted from the central controller;

means for reconstructing an equivalent of the message signal using said digital message data;

means for receiving a precision reference timing signal;

means for determining a current time using said precision reference timing signal;

means for comparing said current time with said launch time; and means, coupled to said means for comparing, for transmitting said reconstructed equivalent of the message signal to the geographical area.

11. The remote site transmitter in accordance with claim 10, wherein said means for receiving a precision reference timing signal comprises a global positioning system (GPS) receiver.

12. The remote site transmitter in accordance with claim 10, wherein said means for storing comprises a first-in-first-out (FIFO) buffer.

13. The remote site transmitter in accordance with claim 10, wherein said means for comparing comprises a digital signal processor.

14. A method of sending message signals from a controller in a simulcast radio transmission system, said controller is coupled to a message source and connected, via a plurality of interconnect links having bounded propagation time delay characteristics, to a plurality of remote site transmitters, each transmitter site for transmitting message signals, along with at least one selective call tone for identifying the message source, to a particular geographical area, the at least one selective call tone having a frequency and a starting phase, wherein the starting phase is the phase at which the at least one selective call tone is to be transmitted at launch time and the message signals including information on the frequency and the starting phase of the at least one selective call tone, the method comprising the steps of:

gathering at the controller the message signals from the message source;

calculating at the controller a launch time based, at least in part, on a received precision reference timing signal and a predetermined propagation time delay, wherein the launch time is the time at which the message signals are to be transmitted by at least one of the plurality of remote site transmitters;

computing at the controller a phase number which corresponds to the phase that the at least one selective call tone is to be at the launch time to allow at least one of the plurality of remote site transmitters to substantially determine the phase of the at least one selective call tone which is transmitted at the launch time;

combining said gathered message signals with said launch time and the at least one selective call tone to establish a message bundle; and sending said message bundle to at least one of the plurality of transmitters, via at least one of the plurality of interconnect links.

* * * * *